June 29, 1926. 1,590,454
J. W. SWAN
AUTOMOBILE RADIATOR HEATING DEVICE
Original Filed Sept. 18, 1918 2 Sheets-Sheet 1
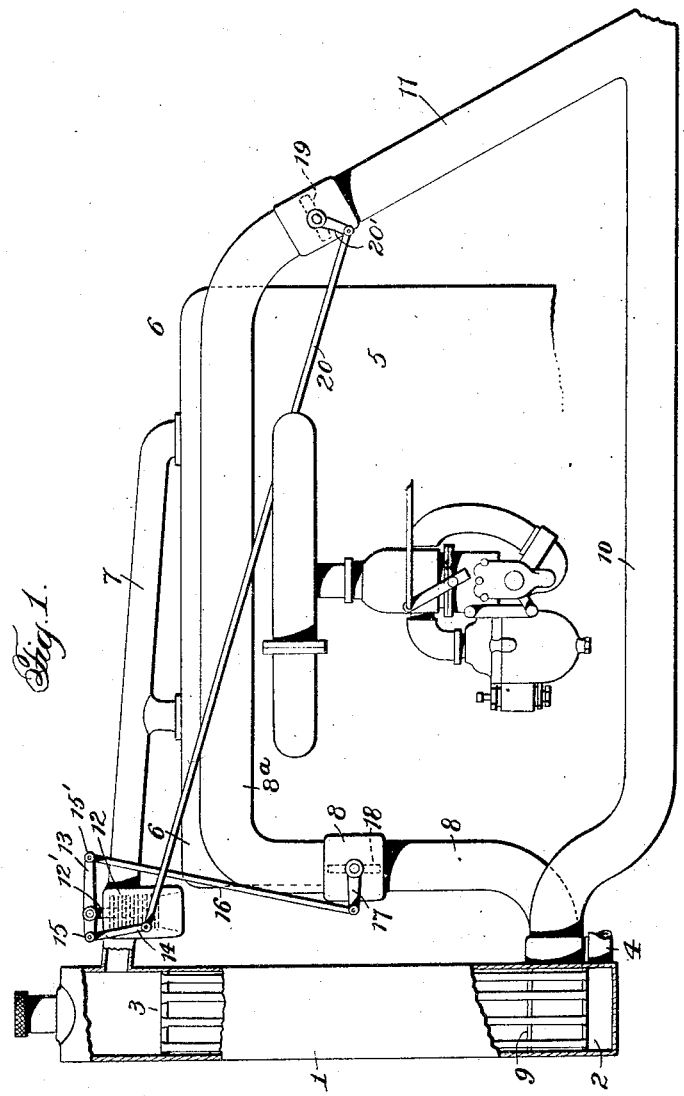

June 29, 1926.
J. W. SWAN
1,590,454
AUTOMOBILE RADIATOR HEATING DEVICE
Original Filed Sept. 18, 1918   2 Sheets-Sheet 2
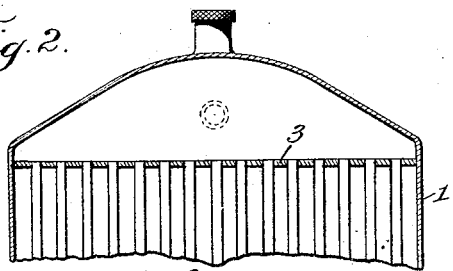
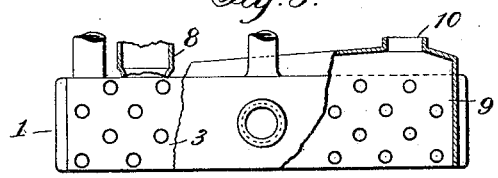
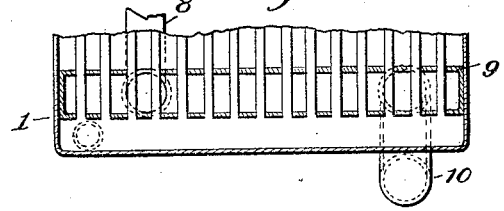
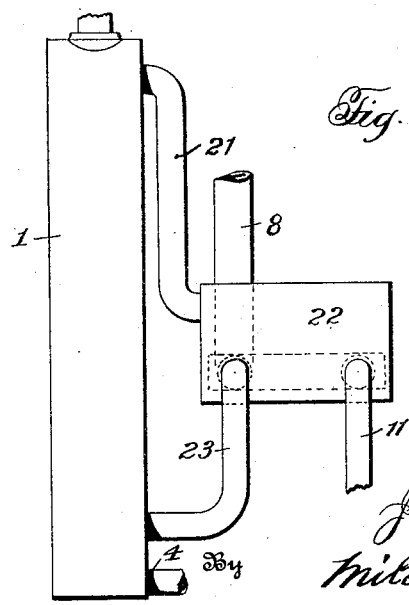

Patented June 29, 1926.

1,590,454

UNITED STATES PATENT OFFICE.

JOHN W. SWAN, OF STAMFORD, CONNECTICUT.

AUTOMOBILE RADIATOR-HEATING DEVICE.

Original application filed September 18, 1918, Serial No. 254,599. Divided and this application filed July 17, 1919. Serial No. 311,556.

The invention relates to improvements in means for utilizing the exhaust heat of an internal combustion engine for heating the water of the engine radiator, and constitutes a division of my copending application, Serial No. 254,599, filed September 18, 1918.

To secure a successful operation of internal combustion engines, especially when the temperature of the air is rather low, it is necessary to utilize all of the heat of the fuel possible to preheat the water passing through the engine jackets, and it is highly desirable to provide a means by which the temperature of this water is maintained substantially uniform irrespective of the work of the engine.

The invention therefore, further comprises means for effecting the passage of the hot exhaust gases from the engine cylinders into association with the water of the radiator should the temperature of this water drop below a given degree, and for automatically cutting off the supply of gases passing to the water and compelling the discharge thereof through a direct discharge disposed remotely from the radiator when the temperature of the water is at or above a given temperature.

With this conception in mind, the invention includes a thermostat disposed within the return water pipe from the radiator to the engine having connections with a plurality of dampers, the thermostat, of course, acting automatically in response to the heat of the water passing from the radiator, and should the water become chilled, a contraction of the thermostat will necessarily follow, causing a closing of one damper in the exhaust pipe, and an opening of the other thereby compelling the gaseous products of combustion in a highly heated condition to pass to the radiator, or in association with water to be delivered to the radiator and after travelling through the radiator these gases are then permitted to escape to the muffler. In accordance with the invention should the temperature of the water passing to the engine pass a given point, then a contraction of the thermostat will cause an operation of the valves directly opposite to the operation produced by the expansion of the thermostat closing the damper in the exhaust pipe leading to the radiator and opening the other damper in the direct exhaust, allowing the exhaust gases to pass on directly to the muffler without imparting heat to the water in the radiator.

In the accompanying drawings I have shown and described the preferred embodiment of the invention, but it will be understood that this disclosure is merely made for the purpose of illustration and not for limitation, and many changes in construction and arrangement, and combination of the parts herein shown can be made without departing from the spirit of the invention.

In the drawings;

Figure 1 represents a side elevation with parts broken away;

Figures 2, 3 and 4 are detail views of the radiator;

Figure 5 is a slightly modified form of the invention.

Referring now more particularly to the drawings wherein like reference characters indicate corresponding parts, the numeral 1 designates a radiator which may be of any conventional type, having the upper and lower headers 2 and 3, the lower header being in communication with the engine cylinders by means of the water conducting pipe 4 leading to the foremost cylinder jacket, this pipe being broken away, but the construction is the same as is now universally used for conveying water from a radiator to the engine jacket. The engine is disclosed by the reference character 5 having the usual engine cylinders 6, and leading from the engine is the return water pipe 7 having communication with the different jackets for conveying the water that has served in cooling the engine cylinders back to the upper header 3 for cooling.

It is highly desirable, particularly during the colder seasons of the year that the heat of the radiator be maintained and the water therein additionally heated prior to its delivery to the engine cylinders, and to this end means are provided for heating the radiator water from the exhaust gases of the engine, comprising a pipe 8 leading from the exhaust manifold 8ª into which the exhaust of the different cylinders is introduced, the pipe 8 discharging into the lower portion of the radiator, see Figure 3, into a container 9 for this purpose, a suitable conveying pipe 10 leading from the opposite side of this container 9 into what may be termed the direct exhaust pipe 11 communicating with a muffler of any well known type. The direct exhaust pipe 11, is, of course, in communication with the manifold 8ª and exhaust gases if not to be used for heating the water in the radiator pass directly through the exhaust manifold and the pipe 11 to the muffler by reason of suitable controlling valves disposed therein which will be now described.

To control the passage of the exhaust gases in compelling them to either pass through the radiator or be directly discharged through the direct discharge pipe 11, controlling means (preferably automatic) are provided. The idea underlying the provision of the automatically acting means is to enable the maintenance of the radiator water at a uniform temperature, and this may be attained by causing the direct or indirect exhaust to operate in consonance with the temperature of the radiator water, which temperature acting through an automatically responsive means will be later described.

As a preferred temperature responsive element, there is disposed in the return water pipe 7 of the radiator a thermostat 12 of any of the well known constructions, which operates in the usual manner being effected by the heat of the water returning to the radiator from the engine jackets. The thermostat has the usual stem part 12′ pivoted between ends of a suitable arm 13 of a bell crank lever, the opposite arm of which is indicated by the reference character 14, the entire bell crank lever comprising these two arms being pivotally mounted at the point 15 upon any suitable support. The free end of the arm 13 is pivoted as at 15′, to a link 16 which is in turn pivoted to the crank arm 17 rigid with a suitable valve 18 disposed within the indirect exhaust pipe 8 and serving to open or close this pipe. A similar valve 19 is disposed within the direct exhaust pipe 11, and this valve is likewise connected with the arm 14 of the bell crank lever by a suitable pivoted link or rod 20 attached to the crank 20′ of this valve.

The valves 18 and 19 disposed in the indirect exhaust pipe 8 and direct exhaust pipe 11, respectively, are so arranged that when one is open, the other is closed, and it will be readily understood that upon the rocking of the bell crank lever through an expansion or contraction of the thermostat 12, a shifting of the links 16 and 20 occurs, which will cause a manipulation of the valves so as to open the valve that was closed prior to this shifting and close the valve that was opened simultaneously therewith. The thermostat selected is one which will withstand a certain degree of heat before expanding and any desirable thermostat can be selected so long as it accomplishes the desired ends.

In Figure 5 of the drawings, I have disclosed a slightly modified form of the invention wherein water from the radiator 1 may be led through a suitable water conducting pipe 21 into a tank 22 through which the exhaust gases circulate instead of conveying the gases directly to the chamber 9 disposed within the radiator 1. After heating the water in this manner, the same is redelivered to the radiator header through a return pipe 23 from where it is conveyed to the engine cylinders. It will be understood that this form of apparatus is used at times where it is found more preferable to heat the water outside of the radiator than to convey the exhaust gases directly to a chamber disposed within the radiator.

While it is believed that the operation of the device will be understood from the foregoing, the same may be briefly stated as follows:

Assuming the water in the radiator to be rather cool while the engine is in operation, due to climatic conditions, then the thermostat 12 will contract until it takes the position shown in Figure 1 having closed the valve 19 by rocking the crank arm 14 and likewise opened the valve 18 through the actuation of the link 16. This will cause the products of combustion to pass directly to the radiator serving to heat the water therein to a proper temperature, but should the temperature of this water exceed a given point, then the thermostat will become heated, expanding as usual, this expansion closing the valve 18 and opening the valve 19 due to a rocking of the bell crank lever whereupon the exhaust gases are prevented from passing to the radiator, but compelled to pass through the direct exhaust pipe 11 to a muffler.

In the accompanying drawings I have shown the preferred embodiment of the invention, but the construction therein shown is subject to many changes without departing from the spirit of the appended claims.

Having thus described the invention, what I claim is:

1. The combination with an engine, a radiator having vertically extending pipes for a cooling medium, a container within the radiator, said container having passages through which the vertical pipes of the radiator pass, means for conveying a cooling medium from the engine to the radiator, means for conveying the cooling medium from the radiator to the engine, and means for conveying the exhaust from the engine to the container, said exhaust circulating around the vertical extending pipes of the radiator.

2. The combination with an engine, a radiator having vertically extending pipes therein, means for conveying a cooling medium from the engine to the radiator, means for conveying the cooling medium from the radiator to the engine, said cooling medium circulating through the vertically extending pipes while in the radiator, a container positioned wholly within the radiator and positioned to receive the lower ends of the vertically extending pipes, and means for conveying the exhaust from the engine to the container, said exhaust being directed against the lower ends of the vertically extending pipes.

In testimony whereof I hereunto affix my signature.

JOHN W. SWAN.